Oct. 5, 1965 C. W. CLAPP 3,210,746
MOTION DETECTING TRANSDUCER
Filed May 1, 1963 4 Sheets-Sheet 1

INVENTOR.
CHARLES W. CLAPP
BY W. J. Shanley Jr.
HIS ATTORNEY

INVENTOR.
CHARLES W. CLAPP
BY
HIS ATTORNEY

Oct. 5, 1965    C. W. CLAPP    3,210,746
MOTION DETECTING TRANSDUCER
Filed May 1, 1963    4 Sheets-Sheet 3

INVENTOR.
CHARLES W. CLAPP
BY
HIS ATTORNEY

INVENTOR.
CHARLES W. CLAPP
BY
HIS ATTORNEY

United States Patent Office 3,210,746
Patented Oct. 5, 1965

3,210,746
MOTION DETECTING TRANSDUCER
Charles W. Clapp, Lynnfield, Mass., assignor to General Electric Company, a corporation of New York
Filed May 1, 1963, Ser. No. 277,388
19 Claims. (Cl. 340—199)

This invention relates to a motion detecting transducer, and more particularly, to an improved variable differential transformer.

Variable differential transformers have been found to be very useful as transducers for detecting small mechanical displacement and generating a signal proportional to the displacement. Such transformers commonly take the form of a solenoidal primary winding and two secondary windings which enclose a soft iron core which is movable in response to the movement to be detected. It is this type of differential transformer to which the invention relates.

As is well known in the prior art, when the primary of a variable differential transformer is excited with an alternating current, there is a central position of the core which results in inducing equal voltages in the two secondary windings. Thus, since the two secondary windings are connected in series opposition, a zero-difference signal null condition exists when the core is in this central position. However, when the core is displaced from this null position, a proportional unbalance in the two secondary voltages will occur and, as is well known in the art, the resulting difference signal may be made to be proportional to the diplacement of the core. However, as has been recognized in the prior art, it is necessary to maintain close regulation of the exciting current or voltage supplied to the primary winding in order to be able to utilize the differential transformer for directly generating an output signal proportional to core displacement. If the excitation voltage is closely regulated, the exciting current will be largely dependent, at power line frequencies, upon the primary winding resistance which in general varies with ambient temperature. The necessity for regulating the primary excitation voltage adds considerably to the complexity and cost of the prior art linear variable differential transformers.

If, on the other hand, it is necessary to render the output signal of the transformer independent of ambient temperature, then it is necessary to directly regulate the primary excitation current at an even greater cost. A rule of thumb found to be useful in estimating the total cost of such equipment is that the accessory equipment necessary to regulate the several watts of power consumed in a 60 cycle variable differential transformer is usually of the same order of magnitude as the transformer itself.

It is thus an object of the invention to dispense with the necessity for regulating exciting current or voltage supplied to the primary of a variable differential transformer while still maintaining the output voltage independent of fluctuation in primary current or voltage over a wide range.

It is also an object of this invention to provide a linear variable differential transformer for accurately measuring mechanical displacement and which may be energized directly from ordinary commercial power sources without the need of intermediate regulation of the magnitude of the energizing potential or current.

It is a further object of the present invention to provide a linear variable differential transformer which may be directly energized from sources of commercial power and is insensitive to variations in the frequency of the commercial power source over a range of frequencies.

In accordance with the invention, the primary winding of the differential transformer may be directly energized from any convenient source of A.-C. power which generates excitation currents in the primary winding of sufficient magnitude to completely saturate the core of the differential transformer on each half cycle. The voltage across the opposing series-connected secondaries is then applied to a synchronous detector for generating a D.-C. potential which is proportional to the movement of said core from a null position.

In accordance with another embodiment of the invention, the A.-C. signals developed in both of the secondary windings may be separately rectified by two rectifiers, the outputs of which are connected in series opposition to provide a D.-C. voltage which is proportional to core displacement.

In accordance with another feature of the invention, provisions are made for rendering the differential transformer insensitive to variations in frequency of the excitation current by applying the different signal appearing across the secondary windings to an integrating circuit the output of which is applied to a synchronous detector for generating the required D.-C. output.

In accordance with another feature of the invention, provisions are made for maximizing the output signal for any given excitation current, the magnitude of which is limited by the heat dissipating characteristics of the transformer. This is accomplished by shaping the field generated by the primary winding, in which the core is supported for movement, and choosing the material and section profile of the core so that the core saturates throughout its volume at substantially the same predetermined value of magnetizing force. This predetermined value is chosen as the magnetizing force produced by applying minimum line voltage to the primary winding, the power dissipating ability of which will not be exceeded when maximum line voltage is applied.

The novel features which are believed to be characteristic of this invention are set forth with particularity in the appended claims. The invention itself, however, both as to its organization and method of operation together with further objects and advantages thereof, may be best understood by reference to the following description taken in connection with the accompanying drawing in which:

Figure 1:
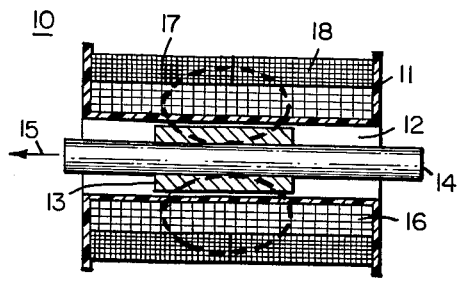
FIG. 1 is a sectional view of a differential transformer of the invention.
Figure 4A:
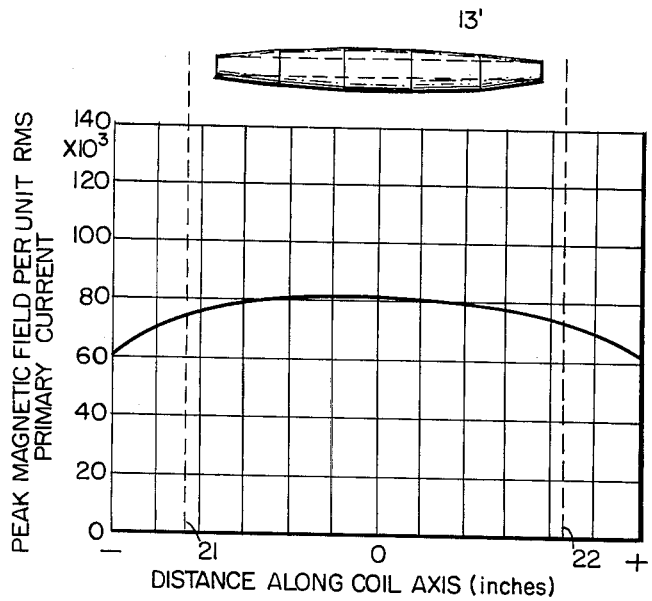
Figure 4B:
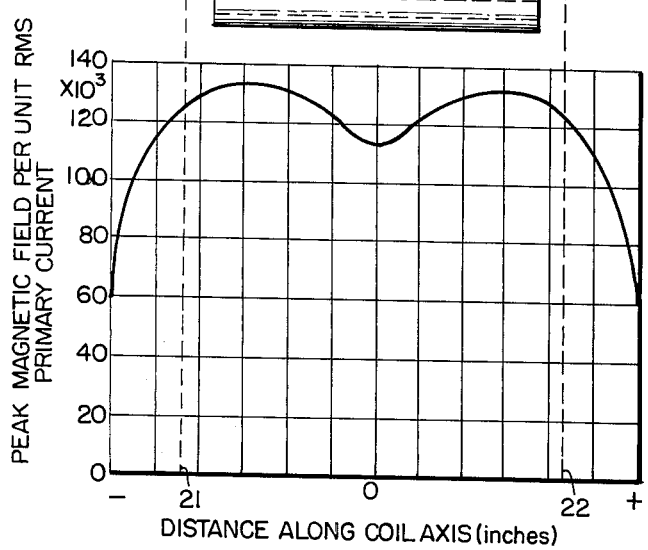
Figure 5:
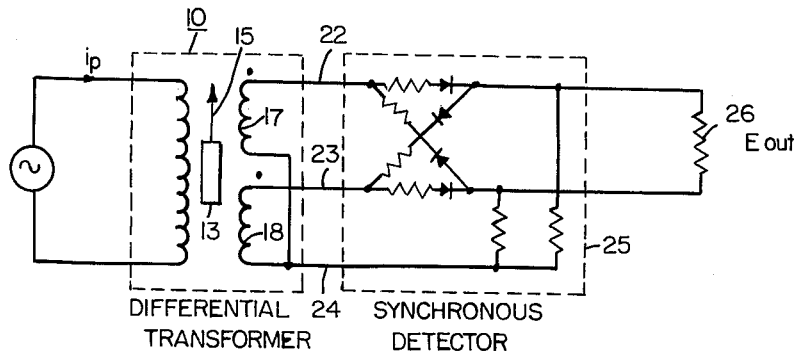
Figure 6:
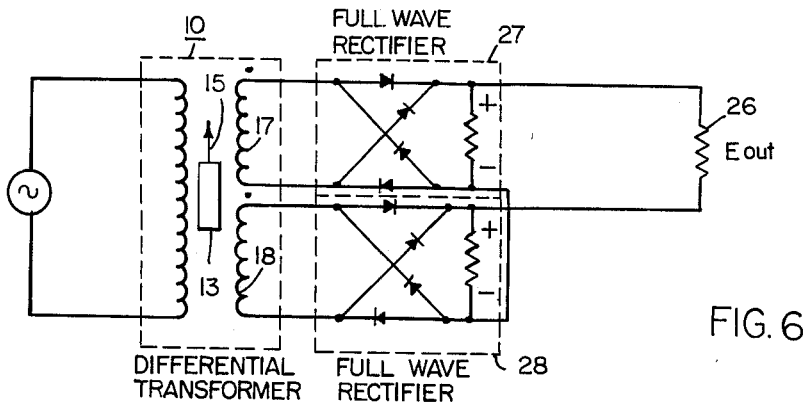
Figure 7:
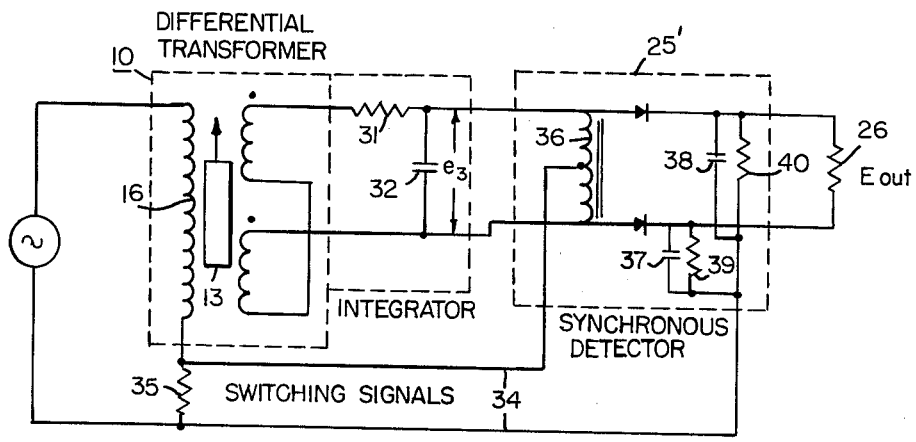
Figure 8:
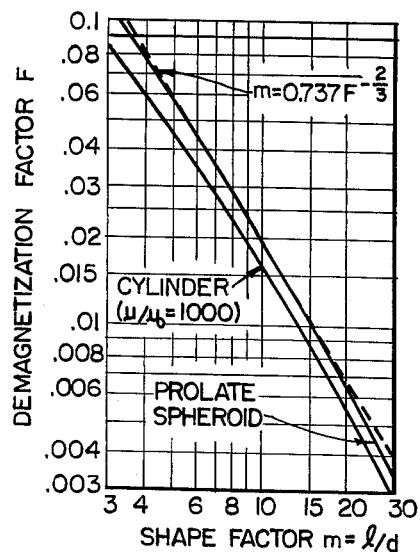

FIGS. 4a and 4b disclose two embodiments of the core of the transformer of FIG. 1 in juxtaposition to plots of the peak magnetizing fields provided by the corresponding embodiments of the primary winding;

FIG. 5 is a schematic diagram of one embodiment of a transducer in accordance with the present invention;

FIG. 6 is another embodiment of a transducer in accordance with the present invention;

FIG. 7 is yet another embodiment of a transducer in accordance with the present invention having provisions for providing a frequency-independent output voltage; and FIG. 8 is a plot of the demagnetization factor F versus shape factor $m$ for a prolate spheroid and a cylinder.

Referring to FIG. 1, a sectional view of the type of transformer utilized in accordance with the invention is illustrated. The transformer 10 comprises a nonmagnetic former or spool 11 having an axial bore 12 for receiving core 13 which is mounted upon supporting shaft 14. Shaft 14, which is made of nonmagnetic material, is supported by any convenient means which will permit the displacement of core 13, longitudinal to the axis of aperture 12, upon application of forces represented by arrow 15.

Primary winding 16, which is coaxially arranged with respect to the axis of aperture 12, by being received upon wire former 11, provides means for generating a magnetic field which links core 13. Secondary windings 17 and 18 which are in turn received within coil former 11 upon top of primary winding 16 are symmetrically arranged on each side of a plane intermediate the ends of coil former 11.

Figure 2:
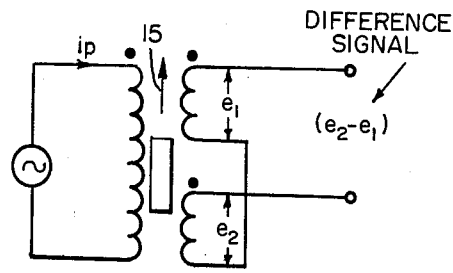
FIG. 2 is a schematic representation of the connection of the windings of the transformer shown in FIG. 1.

Referring now to FIG. 2, it can be seen that in accordance with one form of the invention secondary windings 17 and 18 are directly connected in series opposition so as to generate an output signal which is the difference between the voltage $e_2$ induced in winding 18 and voltage $e_1$ which is induced in winding 17.

The configuration of transformer 10 and the primary and secondary windings are exemplary only and it will be recognized that other configurations can also be utilized in accordance with the invention as long as the magnetizing field is capable of saturating the core in all positions which it will occupy.

A brief review of the theory of operation of the moving core differential transformer will be provided in order to facilitate a discussion of the invention.

It can be shown that for a given value of primary current the magnetic flux linking each secondary winding may be resolved into two components, the flux that would exist if the core were entirely removed and the additional flux resulting from the presence of the core. Assuming that core 13 is in its null position, the first component of flux induces equal voltages in the two secondaries for all values of exciting current and hence does not contribute to the differential output voltage because of the previously noted symmetrical arrangement of windings 17 and 18. The difference signal is therefore produced only by the second component of flux, illustrated as emanating from core 13 in FIG. 1, which is the result of induced magnetization in the core.

Figure 3A:
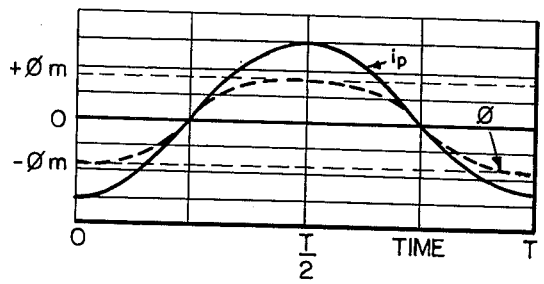
FIGS. 3a and 3b are typical curves useful in explaining the mode of operation of the arrangement shown in FIG. 1.
Figure 3B:
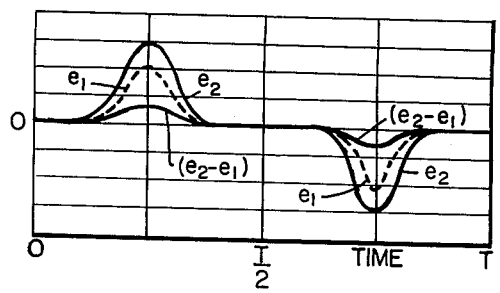

FIG. 3a shows a plot of the primary exciting current $i_p$, here assumed to be sinusoidal although its wave form is not critical, and the amplitude of the flux $\phi$ due to the magnetization of the core material which links the central cross section of the core. Since it is assumed that the peak values of $i_p$ will always be great enough to produce saturation throughout the core, the flux $\phi$ oscillates once each cycle between the two extreme values $+\phi m$ and $-\phi m$. The number of linkages of this core flux with the secondary windings may be written as $Nk_1\phi$ and $Nk_2\phi$ where $k_1$ and $k_2$ are geometric factors depending upon the position of the core relative to the secondary windings 17 and 18, respectively, and N is the number of turns in each winding. The instantaneous secondary voltages, shown in FIG. 3b are therefore given by $$e_1 = Nk_1 \frac{d\phi}{dt}$$

$$e_2 = Nk_2 \frac{d\phi}{dt}$$

The average rectified values of the individual secondary voltages are $$\bar{E}_1 = \frac{1}{T} \int_0^T |e_1| dt$$

$$= 4fNk_1\phi_m$$

and $$\bar{E}_2 = 4fNk_2\phi_m$$

where $f$ is the frequency of the primary current and $$T = \frac{1}{f}$$

is its period. The rectified output voltage is given by (1) $\quad E_{OUT} = \bar{E}_2 - \bar{E}_1 = 4fN\phi_m(k_2-k_1)$ The output is seen to depend on the material of core through the factor $\phi_m$, and on the position of the core through the factor $(k_2-k_1)$. It is also proportional to the frequency of the exciting current but is independent of its magnitude providing the current is strong enough to produce saturation throughout the whole core on each half cycle.

In addition it is noted that if the output difference signal $E_{OUT}$ is to be as large as possible, i.e., if it is to be only limited by the heat dissipating characteristics of the transformer, the core must be so shaped with respect to the free field, in which it is placed, to cause the core to simultaneously saturate along its entire length when, for minimum line voltage, the energization current reaches its peak value.

Referring now to FIGS. 4a and 4b, the manner of optimizing the difference signal when utilizing cores 13 or 13' will now be discussed. First, it should be stated that it can be shown that if a prolate spheroid is placed in a uniform magnetic field the magnetization in the core will also be uniform. Referring now to FIG. 4a, core 13', which constitutes an approximation of a prolate spheroid, is assumed to be in an exciting field generated by primary winding 16 which is uniform throughout the whole region occupied by the core. Therefore, as was previously indicated, the magnetization in core 13' should also be uniform throughout its volume. This means that as the flux in core 13' approaches the saturation point it does so uniformly so that when the core goes to saturation all parts of the core saturate at essentially the same value of exciting current. Thus, the maximum amount of linking flux will pass through core 13' and link the secondary windings before the core saturates.

The net magnetizing force available in the core may be computed as the sum of two magnetizing fields, one due to the exciting current in the primary winding, the second due to the demagnetizing effect of the polarization in the core itself. Hence, at a given field point in the core, (2) $\quad H = H_p - H_d = H_p - FM$ where
$H$ = net magnetizing force in core
$H_p$ = magnetizing force due to current in primary winding
$H_d$ = demagnetizing force due to polarization in core
$F$ = demagnetizing factor
$M$ = magnetization in core
$\quad = \frac{B}{\mu_0} - H$ $B$ = flux density in core
$\mu_0 = 4\pi \times 10^{-7}$ henries/meter = permeability of free space If the exciting field $H_p$ is to just produce saturation in the core, then in Equation 2 we may replace H with $H_s$ and M with $M_s$, where $M_s$ and $H_s$ are, respectively, the saturation magnetization and the magnetizing force required to produce saturation in an infinitely long cylinder of the core material. Making this substitution, Equation 2 becomes $$H_s = H_p - FM_s$$

or (3) $\quad F = (H_p - H_s)(M_s)^{-1}$

Equation 3 establishes the maximum demagnetizing factor that the core may have in terms of the available magnetizing field $H_p$ and the saturation characteristics of the core material.

For a core having the shape of a prolate spheroid with length $l$ parallel to the field and maximum diameter $d$, the value of F as a function of the shape factor $m=l/d$ is given by (4) $\quad F = \frac{1}{m^2-1}\left[\frac{m}{\sqrt{m^2-1}} \log_e (\sqrt{m^2-1}+m) - 1\right]$ The value of F as a function of $m$ is plotted in FIG. 8 where it is seen that, over the range of $.006 \leq F \leq .06$, $m$ is given by (5) $\qquad m = 0.737 F^{-\frac{3}{8}}$ with an error not exceeding 5%.

The maximum polarization flux which links the core and is useful in producing a differential output in the saturated-core LVDT is given by $$\phi_m = A \mu_0 M_s$$

where $A =$ cross-sectional area of the core at its center $$= \frac{\pi d^2}{4} = \frac{\pi}{4}\left(\frac{l}{m}\right)^2$$

or (6) $\qquad \phi_m = \frac{1}{4} \pi l^2 \mu_0 M_s m^{-2}$

Since $m$ can always be found from FIG. 8 and Equation 3, the Equation 6 above allows a calculation of the maximum core flux $\phi_m$ in terms of the core length $l$, the exciting field $H_p$ and the core material characteristics.

In cases where the Equation 5 provides sufficient accuracy, the core flux may be expressed directly in terms of the given variables, as $$\phi_m = 1.446 l^2 \mu_0 (H_p - H_S)^{4/3} (M_S)^{-\frac{1}{3}}$$

In selecting a material for the core it is desirable to choose one which yields the maximum saturated core flux for the given value of $H_p$. It is clear that, for maximum output from a given length of core, the core material should have a relatively low saturation magnetization ($M_S$) and a saturating magnetizing force ($H_S$) that is small compared with the available exciting field ($H_p$). The length of the primary winding 16 will, in general, limit the usable length of core ($l$) which for maximum output should be as long as possible.

The preceding analysis is strictly applicable only if the core has the shape of a spheroid with axis of revolution parallel to the applied field. From practical considerations it may be desirable to modify this ideal form in various ways. For example, it may be desirable to make the core hollow so that it may be supported on a nonmagnetic axial rod or to approximate the external curved surface by a series of conical surfaces for ease in machining as was done in arriving at core 13'. In shaping core 13', the actual cross-sectional area of the core at each point along its major axis should be equal to the corresponding area of the ideal prolate spheroid so that the core area is not changed by its being utilized in its hollow configuration.

Referring again to FIG. 4a, there is shown a plot of the peak magnetizing field of primary winding 16 as plotted along its axis when it is uniformly wound. Thus, core 13' is supported for movement within a substantially uniform magnetic field, points 21 and 22 representing the limits of travel of the core. It has been found that when utilizing a core of 1.875 inches and correspondingly longer transformer assembly that full scale movements of the order of ±.25 inch from the illustrated null position were possible.

If the core has the shape of a long right circular cylinder rather than a spheroid, the demagnetizing factor F is a function not only of its length-to-diameter ratio but also of its permeability and of the point in the cylinder at which the field is to be determined. For a field point taken at the center of the cylinder the factor F is shown in FIG. 8. For field points approaching the ends of the cylinder, F increases appreciably over that given in FIG. 8. Hence, in a uniform alternating exciting field the central portion of a long cylinder will saturate first and the ends will saturate last. Since it is desirable to have all parts of the core saturate at essentially the same value of exciting current, this indicates that the exciting coil winding should be distributed to concentrate the field somewhat near the ends of the cylinder.

It has been found that when cylindrical core 13 is exposed to a field having the field distribution illustrated in FIG. 4b the core will be uniformly magnetized. Therefore, all parts of core 13 will saturate at essentially the same value of exciting current. The field distribution disclosed in FIG. 4b is provided by having primary winding 16 wound in two sections with a gap interposed between the sections thus providing the illustrated saddle-shaped field distribution curve. The core and field distribution combination illustrated in FIG. 4b has been found to be the preferred combination as far as ease of manufacture is concerned since it is normally easier to wind primary winding 16 so as to provide the saddle-shaped distribution curve than it is to machine core 13' to provide its polyconic shape.

Since the differential output wave form of the saturating core differential transformer is far from sinusoidal and varies with operating conditions, a phase sensitive rectifier or synchronous detector, such as is shown in FIG. 5, is utilized. The A.-C. difference signal appearing between conductors 22 and 23 is applied to the synchronous detector, and in addition, the switching signals appearing across secondaries 17 and 18 are connected to synchronous detector 25 over conductors 22, 23 and 24. It has been found to be desirable to control the phasing of detector 25 directly from the voltages developed across secondaries 17 and 18. This avoids the errors introduced by a variable shift within the transformer itself. The circuit of FIG. 5 is particularly suited when the load resistance 26 is small compared with the impedance of secondary windings 17 and 18.

It is not felt to be necessary to discuss in detail the operation of synchronous detector 25 since its operation is old and well known. It suffices here to say that it provides a D.-C. potential across resistor 26 which is equal to the rectified average of the difference signal appearing between conductors 22 and 23. Thus, the output potential $E_{OUT}$ is insensitive to variations in magnitude of the exciting current since it can be shown that these variations change the peak magnitude but not the average value of the difference signal. This rectification takes place synchronously under the control of the switching signals appearing across secondaries 17 and 18.

Referring now to FIG. 6, there is disclosed another averaging rectifier circuit that has given good results when load resistor 26 is large compared with the impedance of secondary windings 17 and 18. In accordance with this circuit, the A.-C. signals appearing across windings 17 and 18 are first rectified in full wave rectifiers 27 and 28, respectively, the outputs of which are connected in series opposition to provide a D.-C. difference signal across resistor 26.

Figure 9:
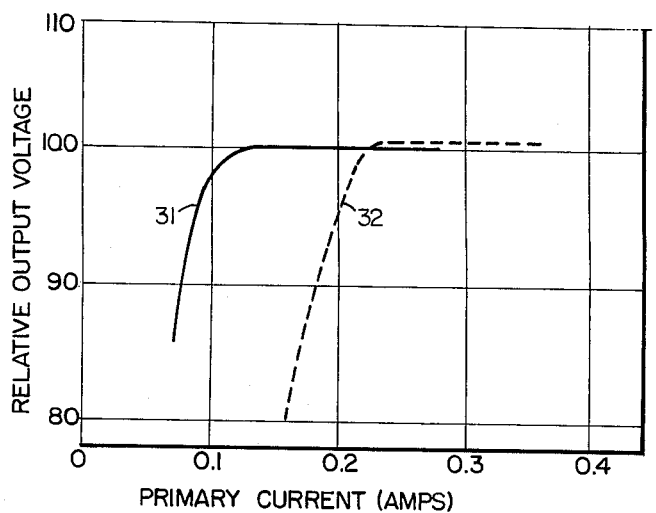

Referring now to FIG. 9, there is illustrated the curves of the differential output voltage versus primary current for both core embodiments when utilized in the configuration of FIG. 5. Curve 31 constitutes a plot when utilizing the combination of FIG. 4b, while curve 32 constitutes a plot of the output voltage when utilizing the combination of FIG. 4a. It can be seen from FIG. 9 that using the polyconical core 13' in the uniform field coil assembly the output voltage remains constant within ±0.1% for primary currents from .26 to .36 amp. This combination can therefore operate with negligible change in output for primary voltages of the order of 90 to 125 volts. The combination utilizing cylindrical core 13 and the primary winding, with saddle-shaped field distribution, the variation in output voltage was less than ±0.1% for primary currents between .14 and .24 amp. This combination can therefore operate with negligible change in output for primary voltages of the order of 80 to 135 volts. A linear relationship between output voltage and core displacement is desirable for most applications of the differential transformer. The conventional nonsaturating differential transformer linearity can be adjusted by changing the length and shape of the core and the turns distribution of both primary and secondary windings. In the saturating core differential transformer of the invention, changes in core geometry and primary windings are restricted by the need to maintain complete saturation in the core, and therefore adjustment of linearity is best accomplished by arranging the distribution of the secondary turns of windings 17 and 18 in a manner well known in the art.

As was previously indicated in the discussion with respect to Equation 1, the average rectified voltage output of a saturating core differential transformer is proportional to the frequency of the exciting current. For some applications the resulting error may be small enough to be neglected when operating from commercial, frequency-controlled power lines. However, in cases where the change in output voltage with supply frequency variations cannot be tolerated means must be provided to compensate for supply frequency variations.

The voltage delivered by the differentially connected secondary is $$(e_2 - e_1) = N(k_2 - k_1)\frac{d\phi}{dt}$$

This voltage is applied to a simple RC integrating circuit consisting of series resistor 31 whose resistance is much larger than the impedance of secondary windings 17 and 18 followed by a shunt capacitor 32 whose reactance is much smaller than resistor 31. The instantaneous voltage across the capacitor 32 is $$e_3 = \frac{1}{C_{32}} \int \frac{(e_2 - e_1) dt}{(r_1 + r_2 + R_3)} = \frac{N(k_2 - k_1)(\phi + K)}{(r_1 + r_2 + R_3) C_{32}}$$

where $r_1$ and $r_2$ are the resistances of secondary windings 17 and 18 and K is an integration constant which, by proper choice of initial conditions, can be made zero. Hence the voltage $e_3$ is directly proportional to the core flux $\phi$ and oscillates between two limiting values just as $\phi$ does (see FIG. 3a). The peak-to-peak value of $e_3$ is then $$e_3 \text{ (peak-to-peak)} = \frac{2N(k_2 - k_1)\phi_m}{(r_1 + r_2 + R_3) C_{32}}$$

Note that, while $e_3$ (peak-to-peak) depends on $\phi_m$ and $(k_2 - k_1)$ in the same manner as the rectified voltage $E_{OUT}$ given by Equation 1, it does not depend on the supply frequency. An output signal proportional to the peak-to-peak swing of $e_3$ therefore shows the same saturation characteristic as $E_{OUT}$ but is unaffected by moderate changes in supply frequency.

The difference signal $e_3$ appearing across capacitor 32 is then applied to synchronous detector 25' which is controlled by switching signals applied over conductors 34 which are connected across resistor 35 which is in series with primary winding 16. In this arrangement it is found to be useful to derive the switching signals from the primary of transformer 10 rather than the secondary as in the arrangement of FIG. 5 since it simplifies the type integrator that is utilized in the system by by-passing the switching signals around the integrator. However, it will be recognized that the switching signals applied over conductors 34 may be derived from secondary windings 17 and 18 in the same fashion as utilized in FIG. 5, in which case a balanced integrator is utilized so that the switching currents flowing through the integrator will have no effect upon $e_3$.

Center tapped inductor 36 provides a low impedance path for charging currents for filter capacitors 37 and 38. Resistors 39 and 40, which are equal in value, are chosen to yield time constants of about .1 to .5 second so as to operate as a peak detecting rectifier. Consequently, the rectified output voltage $E_{OUT}$ appearing across load resistor 26, which should have a resistance several times that of resistors 39 and 40, is insensitive to frequency variations of $e_3$. As was previously indicated in discussing FIG. 5, variations in magnitude of exciting current change only the peak value of the difference signal, not its average value. Therefore, since the change in charge of capacitor 32, each time the difference signal changes sign, is controlled by the average value of the difference signal it will be independent of magnitude variations in the exciting current. Hence, $E_{OUT}$ will be independent of both magnitude and frequency variations in the exciting current.

It has been found that when utilizing the combination of FIG. 4b in the configuration of FIG. 7 a change in output voltage with supply frequency of less than .13% per c.p.s. may be obtained over the range of 54 to 64 cycles per second. Over this same frequency range, the change in output voltage as the primary current was varied from .16 to .24 amp was less than ± 0.2% of full scale.

Thus, in accordance with the invention, by properly selecting core material, core shape and primary winding distribution, it is possible to provide a D.-C. output voltage which is constant to within approximately ±0.1% for supply voltage magnitude variations of the order of ±15%, thus avoiding the need for supply voltage regulation. Also, as was previously indicated, with the arrangement of FIG. 7 the change in output voltage with supply frequency may be held to less than 0.13% per c.p.s. over a range of the order of 54 to 64 c.p.s.

While there has been described what is at present considered to be a preferred embodiment of the invention, it will be apparent to those skilled in the art that various changes and modifications may be made therein without departing from the spirit or scope of the invention.

What I claim as new and desire to secure by Letters Patent of the United States is:

1. In a device for detecting movement and producing a signal proportional thereto the combination comprising, a primary winding for generating a magnetic field, a source of A.-C. power connected to apply excitation currents to said primary winding, first and second secondary windings, means for connecting said secondary windings in series opposition to provide an A.-C. difference signal, a core member of magnetic material, said first and second secondary windings being positioned with respect to the field generated by said primary winding so that an equal amount of flux links said first and second windings when said core is supported in a neutral position, and means for supporting said core for movement in said field from said neutral position in response to the movement to be detected, the movement of said core from said neutral position being oriented with respect to said field to change the magnitude of flux linking said first and second windings in an inverse manner, said difference signal being proportional in magnitude to displacement of said core from said neutral position, said A.-C. source providing signals of sufficient magnitude to generate excitation currents in said primary winding which will saturate said core on each half cycle of said signal throughout the range of movement of said core to thereby make said difference signal insensitive to variations in magnitude of signals from said A.-C. source.

2. The combination of claim 1 in which the turns of said primary winding are distributed so as to generate a field which is shaped with respect to the shape of the core to cause all parts of said core to go into saturation on each half cycle at substantially the same value of said primary excitation current to thus maximize the linking flux obtainable and thus maximize the signals induced in said secondary windings.

3. The combination of claim 2 in which said core member is shaped so as to constitute a first order approximation of a prolate spheroid having its major axis parallel to said field, said generated field of said primary winding being substantially uniform in the region occupied by said core throughout its range of movement.

4. The combination of claim 3 in which said core is hollow with the apertures therein being coaxially aligned with said major axis, and said supporting means comprises a nonmagnetic rod which passes through said core coaxial with said major axis, said core being secured to said rod for movement therewith.

5. The combination of claim 4 in which said supporting means further comprises means for moving said rod longitudinally to said major axis in response to movement being detected.

6. The combination of claim 2 in which said core member is a right circular cylinder having its axis parallel to said field, said generated field of said primary winding being greater in magnitude near both ends of said primary winding than it is near the center of said primary winding.

7. The combination of claim 6 in which said cylindrical core is hollow with the aperture therein being coaxially aligned with the axis of said core, and said supporting means comprises a nonmagnetic rod which passes through said core coaxial with its axis, said core being secured to said rod for movement therewith.

8. The combination of claim 7 in which said supporting means further comprises means for moving said rod longitudinally to its axis in response to movement being detected.

9. In a device for detecting movement and producing a signal proportional thereto the combination comprising, a primary winding for generating a magnetic field, a source of A.-C. signals connected to apply excitation currents to said primary winding, first and second secondary windings, means for connecting said secondary windings in series opposition to produce an A.-C. difference signal, a core member of magnetic material, said first and second secondary windings being positioned with respect to the field generated by said primary winding so that an equal amount of flux links said first and second windings when said core is supported in a neutral position, means for supporting said core for movement in said field from said neutral position in response to the movement to be detected, the movement of said core from said neutral position being oriented with respect to said field to change the magnitude of flux linking said first and second windings in an inverse manner, said difference signal being proportional in magnitude to displacement of said core from said neutral position, and means connected to said difference signal producing means for detecting said difference signal to produce a D.-C. difference potential, said A.-C. source providing signals of sufficient magnitude to generate excitation currents in said primary winding which will saturate said core completely on each half cycle of said signal throughout the range of movement of said core to thereby make said difference signal insensitive to variations in magnitude of signals from said A.-C. source as long as the excitation currents remain large enough to saturate said core completely on each half cycle.

10. The combination of claim 9 in which said detecting means comprises a diode bridge demodulator having said difference signal applied across one diagonal of said bridge, the output of said demodulator being provided across the other diagonal of said bridge.

11. The combination of claim 10 further comprising a source of switching signals of a frequency equal to the frequency of said A.-C. source, and means for synchronously controlling the detection of said A.-C. difference signal in accordance with said switching signals.

12. The combination of claim 11 in which said source of switching signals comprises said secondary windings, and said synchronous detecting means produces a D.-C. potential which is proportional to the average value of said difference signal.

13. In a device for detecting movement and producing a signal proportional thereto the combination comprising, a primary winding for generating a magnetic field, a source of A.-C. signals connected to apply excitation currents to said primary winding, first and second secondary windings, means for connecting said secondary windings in series opposition to produce an A.-C. difference signal, a core member of magnetic material, said first and second secondary windings being positioned with respect to the field generated by said primary winding so that an equal amount of flux links said first and second windings when said core is supported in a neutral position, means for supporting said core for movement in said field from said neutral position in response to the movement to be detected, the movement of said core from said neutral position being oriented with respect to said field to change the magnitude of flux linking said first and second windings in an inverse manner, said A.-C. difference signal being proportional in magnitude to displacement of said core from said neutral position, said difference signal producing means comprising first means for detecting the signal induced in said first winding, signal means for detecting the signal induced in said second winding and means for connecting the outputs of said detecting means in series opposition, said A.-C. source providing signals of sufficient magnitude to generate an excitation current in said primary winding which will saturate said core completely on each half cycle of said signal throughout the range of movement of said core to thereby make said difference signal insensitive to variations in magnitude of signals from said A.-C. source as long as the excitation currents remain large enough to saturate said core completely on each half cycle.

14. The combination of claim 13 in which said first and second detecting means each comprises full-wave averaging diode bridge demodulators having one diagonal connected across the output of the corresponding secondary winding, the other diagonal of each of said bridges being connected in phase opposition.

15. In a device for detecting movement and producing a signal proportional thereto the combination comprising, a primary winding for generating a magnetic field, a source of A.-C. signals connected to apply excitation current to said primary winding, first and second secondary windings, means for connecting said secondary windings in series opposition to provide an A.-C. difference signal, a core member of magnetic material, said first and second secondary windings being positioned with respect to the field generated by said primary winding so that an equal amount of flux links said first and second windings when said core is supported in a neutral position, means for supporting said core for movement in said field from said neutral position in response to the movement to be detected, the movement of said core from said neutral position being oriented with respect to said field to change the magnitude of flux linking said first and second windings in an inverse manner, said difference signal being proportional in magnitude to displacement of said core from said neutral position, and means connected to said difference signal producing means for integrating said difference signal, said A.-C. source providing signals of sufficient magnitude to generate an excitation current in said primary winding which will saturate said core completely on each half cycle of said signal throughout the range of movement of said core to thereby make said difference signal insensitive to variations in magnitude of signals from said A.-C. source as long as the excitation currents remain large enough to saturate said core completely on each half cycle.

16. The combination of claim 15 further comprising means connected to the output of said integrating means for detecting the integrated difference signal to produce a D.-C. difference potential which is insensitive to variations in the output frequency of said A.-C. source over a range of frequencies.

17. The combination of claim 16 further comprising a source of switching signals of a frequency equal to the frequency of said A.-C. source, said detecting means comprising at least a pair of diodes, and means for controlling the switching of said diodes so as to synchronously detect the peak value of said integrated difference signal.

18. The combination of claim 17 in which said source of switching signals comprises a resistance connected in series with said primary winding.

19. In a device for detecting movement and producing a signal proportional thereto the combination comprising, a primary winding, a source of A.-C. power connected to apply excitation currents to said primary winding, a secondary winding, a movable core of magnetic material, means for connecting said windings to provide an A.-C. difference signal across said secondary winding, said secondary winding being positioned with respect to the fields generated by said primary winding so that said difference signal is zero when said core is in a neutral position, said core being movable in response to movements to be detected to produce an A.-C. difference signal of magnitude and phase proportional to the magnitude and direction of movement of said core from said neutral position, said A.-C. source providing signals of sufficient magnitude to generate excitation currents in said primary winding which will saturate said core on each half cycle of said signal throughout the range of movement of said core to thereby make said difference signal insensitive to variations in magnitude of signals from said A.-C. source.

No references cited.

NEIL C. READ, *Primary Examiner*.